UNITED STATES PATENT OFFICE.

EZRA F. WOOD, OF NEW YORK, N. Y., ASSIGNOR TO INTERNATIONAL NICKEL COMPANY, OF NEW YORK, N. Y., A CORPORATION OF NEW JERSEY.

PROCESS OF UTILIZING FLUE-DUST.

No. 884,970.   Specification of Letters Patent.   Patented April 14, 1908.

Application filed October 20, 1906. Serial No. 339,741.

*To all whom it may concern:*

Be it known that I, EZRA F. WOOD, of New York city, county of New York, and State of New York, have invented a new and useful Process of Utilizing Flue-Dust, of which the following is a specification.

In the smelting of the ores of copper and of copper and nickel, much difficulty has been experienced by reason of the losses occasioned by the flue dust; that is, the fine particles of the charge of the smelting furnace which are carried out with the furnace gases and are deposited in the outlet flues. There is ordinarily a loss of from five to eight per cent. of the ore charge of the furnace due to this cause. Many efforts have been made to utilize this flue dust by resmelting it in the furnace. If the dust is briqueted for this purpose, that is to say, compressed into small briquets or cakes, the work of making the briquets sufficiently strong for the purpose is expensive and the result is, at best, unsatisfactory, for the briquets are generally friable and go to pieces in the furnace. If the flue dust is wetted and is charged back directly into the furnace, it occasions serious difficulties, because a large part of it is carried out of the furnace with the gases, thus increasing the percentage of dust deposited in the flues and diminishing greatly the working efficiency of the furnace. The matter, therefore, is a very serious one to the operators of furnaces, but it is met satisfactorily by my invention, which consists in taking the flue dust and mixing the flue dust with a portion of green ore sufficient to augment the sulfur contents of the flue dust, then placing the mixture in a suitable receptacle or furnace, heating it, preferably by means of a charge of coke or wood ignited at its base, and then blowing air through it. This causes the ignition of the mixture and combustion of the sulfur contents thereof, which raises the mixture gradually to a heat sufficient to cause a sintering of the mass into a coherent body which can be removed from the furnace and broken up into pieces. These pieces are sufficiently strong to hold together in the blast furnace and can be smelted with great economy without materially increasing the percentage of flue dust.

In the conduct of the process, the mixture of ore and flue dust should be made so as to give a proper proportion of sulfur in the resultant mass to maintain the required combustion, and the blast of air through the mass should be controlled. If it is permitted to become too rapid, it results in a general chilling of the material, which retards the operation, and is apt to cause excessive heating of the material in spots. The operation of blowing the air through the material will continue about four to eight hours, it being readily controlled by the operator, who continues it long enough to bring the charge to the temperature at which it sinters.

To indicate the proportions which I deem best suited for the practice of my invention, I will state the following, although it will be understood by those skilled in the art that these proportions are given as illustrative, and that they may be varied within considerable limits in accordance with the particular kind of ore and flue dust which is to be treated. I take ore which may contain approximately the following composition:

Copper _____ 1.69 per cent.,
Nickel _____ 5.13 per cent.,
Iron _____ 45.70 per cent.,
Silicon _____ 9.65 per cent.,
Sulfur _____ 27.79 per cent.

I mix this green ore with flue dust, preferably in about equal proportions. The flue dust may contain the same elements as the ore, the proportions differing by reason of a lesser content of sulfur in the flue dust, which is generally about eight per cent. Such ore and flue dust being mixed in about equal proportions, are placed in the furnace and treated as above stated.

Without limiting my invention to the precise proportions and details of operation above described, since these may be varied by those skilled in the art within the scope of the invention, as defined in the claims,

What I claim is:

1. The method herein described of utilizing flue dust of sulfur-bearing ores, which consists in mixing such flue dust with ore richer in sulfur than the flue dust, igniting the mass, blowing air therethrough, and causing thereby a sintering of the mixture.

2. The method herein described of utilizing flue dust of sulfur-bearing ores, which consists in mixing such flue dust with green ore richer in sulfur than the flue dust, igniting the mass, blowing air therethrough, and causing thereby a sintering of the mixture.

3. The method herein described of utilizing flue-dust of sulfur-bearing ores, which consists in mixing such flue-dust with ore richer in sulfur than flue-dust, without admixture of carbon or flux, igniting the mass, blowing air therethrough, and causing a sintering of the mixture.

4. The method herein described of utilizing flue dust of sulfur-bearing copper and nickel ores, which consists in mixing such flue dust with ore richer in sulfur than the flue dust, igniting the mass, blowing air therethrough, and causing thereby a sintering of the mixture.

In testimony whereof, I have hereunto set my hand.

EZRA F. WOOD.

Witnesses:
ALBERT W. JOHNSTON,
H. E. FLEWELLIN.